Jan. 8, 1924. 1,480,186
F. W. SMITH
COOKER
Filed Jan. 6, 1922 3 Sheets-Sheet 1
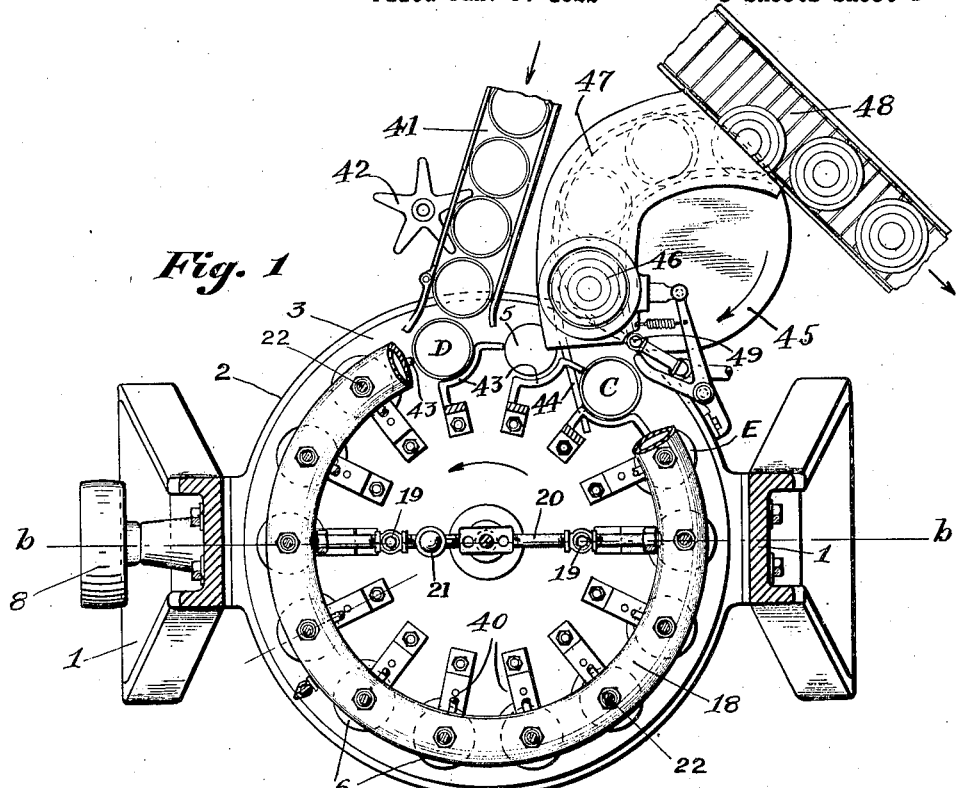
Fig. 1
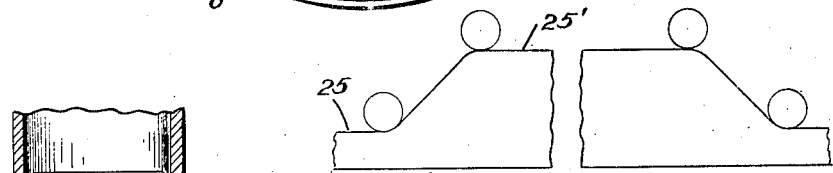
Fig. 2.
Fig. 3.
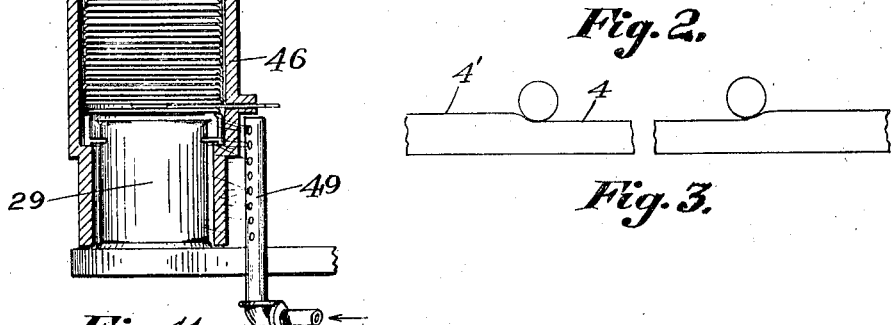
Fig. 11.
Inventor.
Frank Wendell Smith Jan. 8, 1924. 1,480,186
F. W. SMITH
COOKER
Filed Jan. 6, 1922  3 Sheets-Sheet 2

Inventor:
Frank Wendell Smith

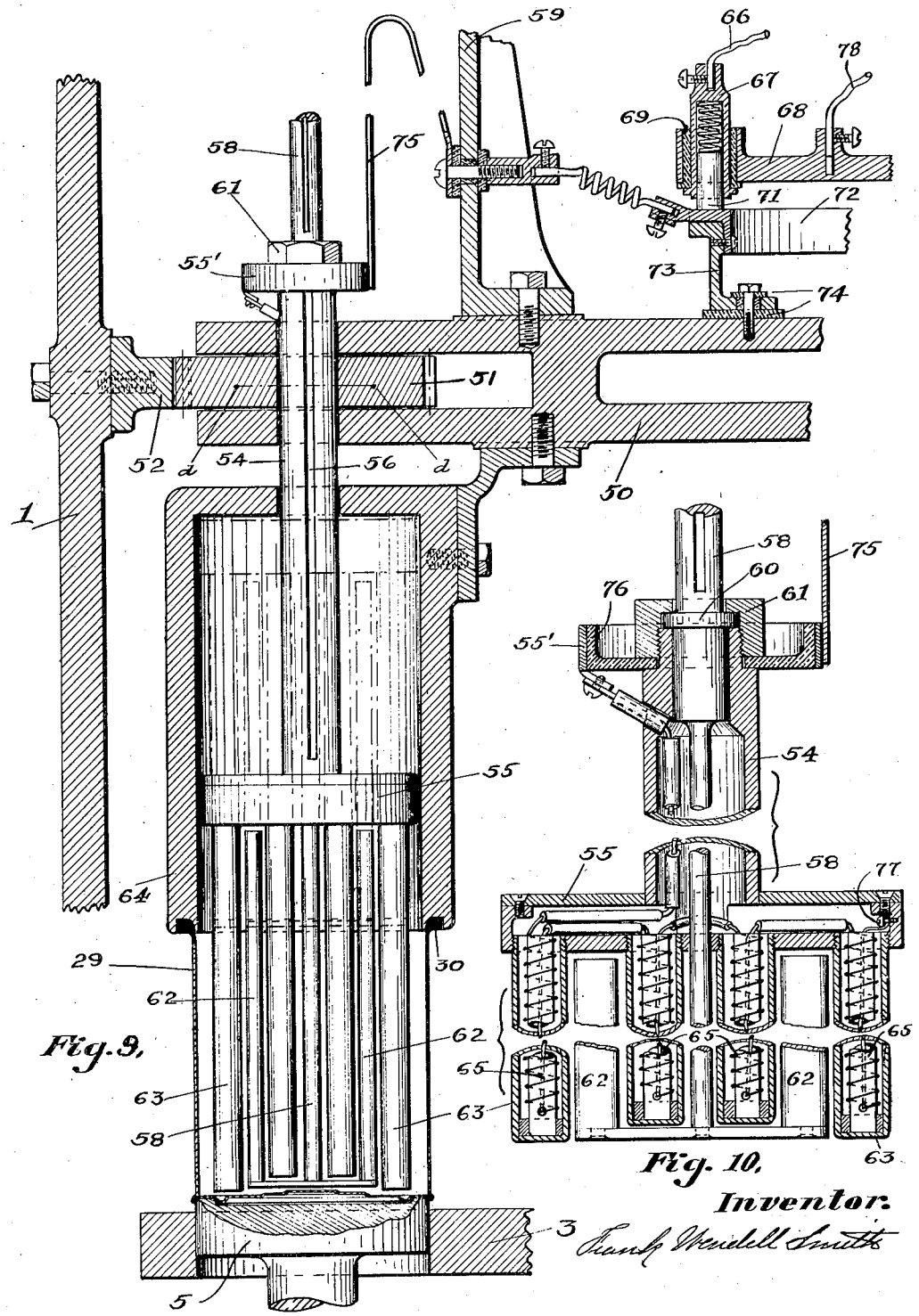

Patented Jan. 8, 1924.

1,480,186

UNITED STATES PATENT OFFICE.

FRANK WENDELL SMITH, OF PORTLAND, MAINE.

COOKER.

Application filed January 6, 1922. Serial No. 527,424.

*To all whom it may concern:*

Be it known that I, FRANK WENDELL SMITH, a citizen of the United States, residing at Portland, in the county of Cumberland and State of Maine, have invented new and useful Improvements in Cookers, of which the following is a specification.

The primary object of my invention is to heat treat food products in the container in which they are to be marketed, using as the heating medium electric resistance coils.

A method frequently used in processing food is to apply steam heat to the outside of the can, jar or container for the food, in varying degrees of temperature, the food having previously been sterilized or preheated in bulk, then transferred to the individual container in which it is to be marketed, then sealed, and finally subjected to a further heat treatment before it is considered to be in a condition ensuring its preservation.

In the case of some food products it is well known that a considerable length of time is required for the heat, applied to the outside of the container, to penetrate to the center of same, in consequence of which the mass of food in the center of the container gets insufficient heating while that near the outside gets too much.

Some inventors have attempted to remedy this trouble by tumbling or rolling the sealed containers while going through the final processing, striving to equalize the heat throughout the contents of the container, but their success has been questionable.

In considering the subject of cooking of food products I assumed, and in my experiments I ascertained that the closer the heat was applied to the food the better it was cooked, and in my machine I have applied the heat directly into the food while in the marketing container. In my experimenting I have also demonstrated the fact that a proper mixing or stirring of the food greatly accelerates the completion of the work, and I have adopted this feature in the construction of my cooker. There will be, moreover, several advantages accruing from the use of the electric current for cooking purposes, as for instance, the absence of all contamination of the food, resulting from the entrance therein of foreign matter from foul pipes, oil or scale from the boiler, condensation of the steam used in the process when this heating agent is employed, and which not only dilutes the juices but often destroys their flavor, and particularly the advantage of procuring an easy control over the temperature of the food being cooked.

Figure 4:
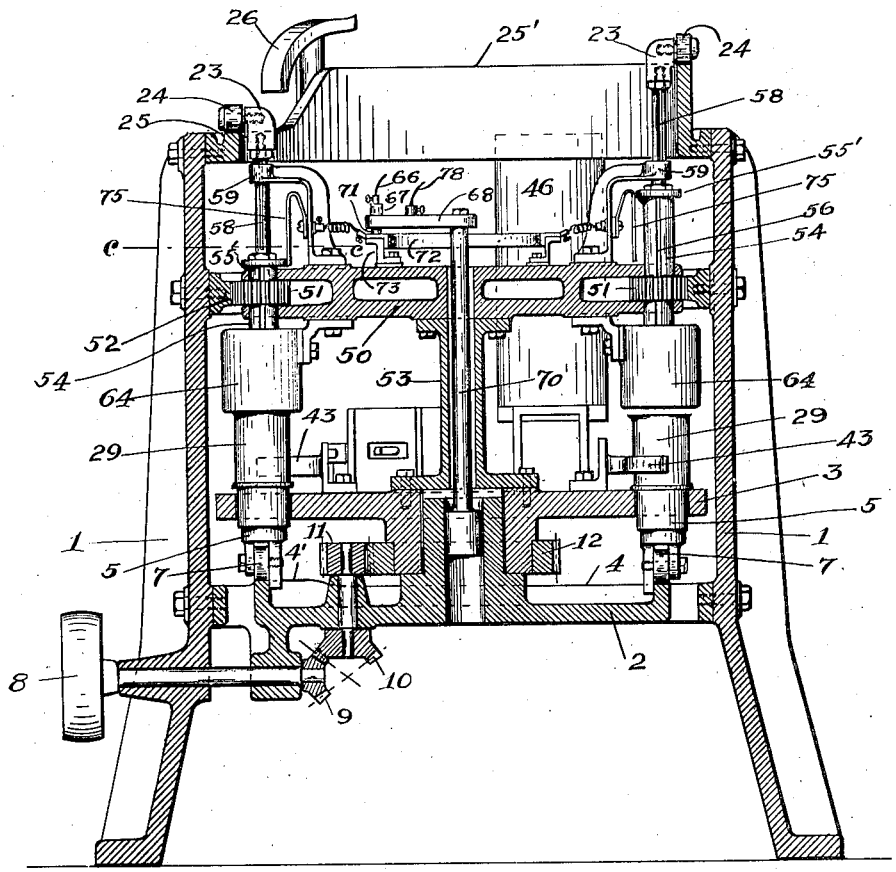
Figure 6:
Figure 5:
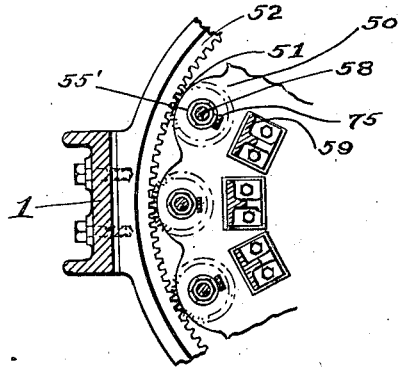
Figure 7:
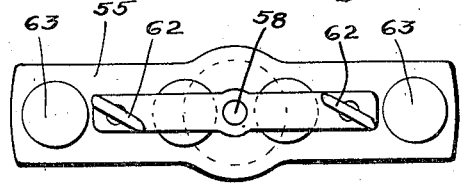
Figure 8:
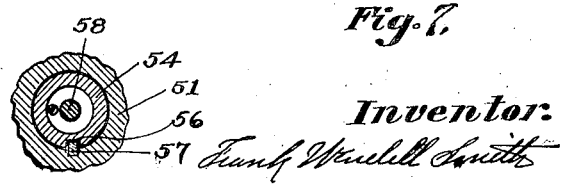

In the accompanying drawings Fig. 1 is a plan view of my cooker showing steam supply ring 18 instead of electric heaters; Fig. 2 is a profile of the cam used for elevating and lowering the heating units; Fig. 3 is a profile of the cam used for elevating and lowering the plugs which position the containers; Fig. 4 is a sectional elevation of the cooker taken on the central line $b$, $b$, Fig. 1. Fig. 5 is a fragmentary plan view of the fixed ring gear and heating unit pinions, the section of the frame being taken on line $c$, $c$, Fig. 4; Fig. 6 is a fragmentary plan view of one of the guides for the elevating shafts; Fig. 7 is an inverted plan of one of the electric heating units; Fig. 8 is a cross section of a heating unit shaft, showing the driving key,—the section being taken on line $d$—$d$, Fig. 9; Fig. 9 is an elevation of an electric heating unit with the contiguous parts in section and shows a container for food resting on an elevating plug and raised to the overflow chamber; Fig. 10 is a sectional elevation of a heating unit, the section being taken on a central line through all the elements and Fig. 11 illustrates a dry steam sprayer which may be used in connection with the cap dropper.

Similar numerals refer to similar parts throughout the several views.

In Fig. 1 and Fig. 4, 1 represents the leg and vertical part of the frame. Connecting these two members is a bed piece 2, upon which, and concentric with the axis of revolving table 3, is a cam ring. Travelling on this cam ring and extending upward through the revolving table 3 are elevating plugs 5, which alternately seat the container for food upward against the under side of heating unit over-flow chamber 64, and release same for removal from the table. On the left, in Fig. 4 is shown the container raised, and on the right the container lowered, the raising being effected by the top face of the cam being slightly higher, as seen at 4'. To eliminate friction these elevating plugs are mounted on rolls 7, and have inner sides extending below the top surface of the cam to prevent the plug revolving on its own axis. To impart turning movement to table 3, any suitable power may be applied to pulley 8, and on through pinions 9, 10 and 11, and gear 12, the latter being rigidly fixed to the table.

By observing Fig. 1 it will be seen that the containers are fed into the machine on conveyor or run-way 41, by the star wheel 42 and on to revolving table or dial 3. Locating arms 43 accurately align the containers over plugs and under chambers. Table turns in direction of arrow, and when, in its turning movement, the containers have been carried to a position such as is occupied by the container at "C", the latter contacts with a deflecting arm 44 which disengages it from locating arms 43 and forces it off on to a revolving dial 45, in the meantime having had a cover dropped on to it from cap dropper at 46, from whence it is conducted through covered passage 47 on to carrier 48 and then on to a closing machine, not shown in drawing.

No pretense to novelty in the cap or cover dropper is made, as I may use any conventional style now used generally for this purpose, but I provide a novel sanitary feature by installing a super-heated steam vaporizer 49 (see Fig. 11), the spray from which follows the container, after being freed from overflow chamber, up to the time when the container is covered by a cap. Any suitable source for obtaining a supply of superheated steam may be utilized.

Proper timing of the lowering and elevating of heating units is provided by the contour of cam surface 25 and 25′, Fig. 2. The unit starts down when the container gets into first registered position, as at "D" seen in Fig. 1; when lowered to extreme position, it remains there until the container arrives around the circle to position as at "E"; here it starts upward and is entirely clear of the container when the latter arrives at position "C".

Fig. 3 likewise gives the cam position for grip and release of the container between the elevating plug 5 and the overflow chamber 64.

In fixed relation to the revolving table 3 is a second or upper table 50 on which I mount at equally spaced intervals housed pinions 51, engaging in an internal cut ring gear 52 rigidly secured to frame 1.

It will readily be seen that a movement of this table on its axis, secured as it is to lower table 3 by flanged pipe 53, will produce a turning movement of each of the pinions 51 on their axes.

My object in producing this movement will be readily comprehended if reference is had to Fig. 9, in which I have shown a full electric heating unit. Hollow shaft 54, extending upward from heating coil connecting box 55, through pinions 51, to commutator ring 55′, has a key-way 56 cut on its outer surface, in which a feather or key 57 slides, as shaft is raised or lowered. This key is secured rigidly to pinion 51 and gives turning movement to shaft 54. Within this hollow shaft is another shaft 58, extending from the lower extremity of the heating unit up through shaft 54 and terminating in the guide 23,—its upper end being considerably enlarged where it passes through guide bracket 59. This shaft is also keywayed and a feather or key inserted in guide bracket 59. This prevents any turning on its axis of shaft 58, but allows freedom of movement up or down.

In Fig. 10 is shown my design for obtaining a simultaneous vertical movement of both shafts (54 and 58) while at the same time one is revolvable and the other is not. On shaft 58 is a collar 60, held in revolvable contact with upper end of shaft 54 by sleeve nut 61, which is screwed on to end of 54. On the extreme lower end of shaft 58 is a cross-wise bar, mounted upon which and extending upwardly are stationary resistance blades 62.

From under side of heating coil connecting box 55 extend downwardly, tubes 63, which contain the heating coils. Now it will be seen that when the table 50 is in motion, pinions 51 will revolve shaft 54, and this latter shaft being connected to and a part of 55, will start a revolving movement to tubes 63, which in this case serve as paddles. It will also be noticed that as shaft 58 is prevented from revolving in bracket 59, the upward turned blades 62 remain fixed, while the tubes 63 are moving in circles around shaft 58; consequently, when the machine is put in operation and the heating unit is lowered into the food in a container the effect is to thoroughly mix same and not to simply move it around bodily in one undisturbed mass.

Obviously when guides 23 rise from cam surface 25 to cam surface 25′ they carry the whole connected heating unit upward, as seen in dot and dash lines, Fig. 9, so that the container just operated on can slide out from under overflow chamber 64, and another container slide into position.

Figs. 9 and 10, clearly show one method of conducting the electric current to the heating coils 65, but I do not confine myself to this particular design, as my object may be attained by any practical arrangement of wiring and connections, other than the specific one shown in the drawings.

In Fig. 9, 66 is the main feed wire connected to post 67 which is insulated from arm 68 by insulating material bushing 69. Arm 68 is held in rigid position by being secured to post 70, which in turn is held by drive fit in bed piece 2. In post 67 is brush 71, contacting on metal ring 72, held in position by brackets 73,—the latter insulated from upper table 50 by insulator 74. Current is carried to flexible brush 75 through insulated post in guide bracket 59. This brush (75) contacts with collecting ring 55' which is insulated from shafts 54 and 58 by insulating ring 76. The end of the heating unit coils is grounded at 77, and main line ground wire is at 78; thus it will be seen that a closed circuit always exists, as shown in the drawings. I can, however, if I wish, open the circuit while heating unit is not in the food, by reducing the height of the flexible brush 75, so that when the collector ring 55' rises with the heating unit to extreme high position, it would be above and out of reach of contact with flexible brush 75.

Having thus described the mechanical details of my cooker, I claim:

In a machine for cooking or sterilizing food products, consisting of a base member, a ring portion projecting upwardly from said base with a cammed surface on its upper face, a hollow upwardly extending trunnion located centrally of and integral with said base, a circular table centrally journalled over said trunnion, means for rotating said table, a plurality of holes extending through said table near its outer circumference and with their axes in vertical alignment with the said cammed surface, plungers adapted to reciprocate in said holes, rolls attached to the bottom ends of said plungers and in contact with the said cammed surface, a second table placed above and at a spaced distance from, and rigidly connected to, said first mentioned table, a plurality of holes in said second table in alignment with the holes in said first mentioned table, shafts extending through the holes in said second mentioned table, their lower ends protruding into a bracketed cylinder, the latter constituting an overflow chamber, means provided on the lower end of the wall of said cylinder to effect a temporary seal over the top of an open ended can placed thereunder, pinions slidably mounted on and rotating with said shafts, a ring, with a gear cut on its inner periphery rigidly secured to the said frames, said gear to encircle and mesh with all of the said pinions, a second cammed ring rigidly secured to the upper portions of said frames, rolls on the top ends of said shafts in contact with the cam surface of the said second mentioned cammed ring, whereby a vertical movement may be given to said shafts, an electric resistance coil unit, housed in protecting shells and with one or more depending elements, rigidly secured to the lower ends of all of the said shafts, means for keeping a closed circuit through the said coils during the vertical and rotatable movement of said shafts, means on the upper ends of each of the said plungers to align a can axially with said bracketed cylinders, means for locating in-feeding cans over said plungers and means for deflecting the said cans from off the said first mentioned table.

FRANK WENDELL SMITH.